United States Patent
Iwamoto et al.

(10) Patent No.: US 7,814,555 B2
(45) Date of Patent: Oct. 12, 2010

(54) INFORMATION NETWORK SYSTEM AND INFORMATION APPARATUS

(75) Inventors: Kiyotaka Iwamoto, Uji (JP); Tomomi Nagata, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1202 days.

(21) Appl. No.: 11/393,667

(22) Filed: Mar. 31, 2006

(65) Prior Publication Data

US 2006/0222177 A1 Oct. 5, 2006

(30) Foreign Application Priority Data

Apr. 1, 2005 (JP) .............................. 2005-105998

(51) Int. Cl.
G06F 7/04 (2006.01)
G06F 17/30 (2006.01)
H04N 7/16 (2006.01)

(52) U.S. Cl. ........................................ 726/27; 380/200
(58) Field of Classification Search .................. 726/27; 380/200

See application file for complete search history.

(56) References Cited

U.S. PATENT DOCUMENTS

| | | | | |
|---|---|---|---|---|
| 6,469,239 | B1 * | 10/2002 | Fukuda ......................... | 84/602 |
| 6,636,953 | B2 * | 10/2003 | Yuasa et al. .................. | 711/161 |
| 6,922,845 | B2 * | 7/2005 | Yap et al. ..................... | 725/141 |
| 6,999,947 | B2 * | 2/2006 | Utsumi et al. ................. | 705/59 |
| 7,340,061 | B1 * | 3/2008 | Hamada et al. ............. | 380/278 |
| 7,502,543 | B2 * | 3/2009 | Kato ........................... | 386/46 |
| 7,567,487 | B2 * | 7/2009 | Ito et al. .................... | 369/47.12 |
| 7,634,785 | B2 * | 12/2009 | Smith .......................... | 725/34 |
| 2001/0052130 | A1 * | 12/2001 | Yap et al. ..................... | 725/90 |
| 2002/0095615 | A1 * | 7/2002 | Hastings et al. ................ | 714/4 |
| 2002/0100052 | A1 * | 7/2002 | Daniels ....................... | 725/87 |
| 2002/0141732 | A1 * | 10/2002 | Reese et al. .................... | 386/46 |
| 2003/0051151 | A1 * | 3/2003 | Asano et al. ................. | 713/193 |
| 2003/0123378 | A1 * | 7/2003 | Lin et al. .................. | 369/275.3 |
| 2003/0138236 | A1 * | 7/2003 | Um et al. ....................... | 386/69 |
| 2003/0188320 | A1 * | 10/2003 | Shing .......................... | 725/131 |
| 2004/0030898 | A1 * | 2/2004 | Tsuria et al. ................. | 713/171 |
| 2004/0033052 | A1 * | 2/2004 | Lim et al. ...................... | 386/46 |
| 2004/0078829 | A1 * | 4/2004 | Patel et al. ................... | 725/135 |
| 2004/0190853 | A1 * | 9/2004 | Dow et al. ..................... | 386/46 |
| 2004/0213552 | A1 * | 10/2004 | Kato .......................... | 386/69 |
| 2005/0055717 | A1 * | 3/2005 | Daniels ....................... | 725/58 |
| 2005/0055730 | A1 * | 3/2005 | Daniels ....................... | 725/134 |
| 2005/0060755 | A1 * | 3/2005 | Daniels ....................... | 725/134 |

(Continued)

FOREIGN PATENT DOCUMENTS

JP 2004-5526 1/2004

*Primary Examiner*—David Garcia Cervetti
(74) *Attorney, Agent, or Firm*—McDermott Will & Emery LLP

(57) ABSTRACT

Upon receiving an input of a request to move data to an external recording medium, a first information apparatus: transfers to record contents data after performing conversion under compression; encrypts the contents data and stores it in a concealment area of an internal recording medium; transfers to record the contents management information containing key information to the external recording medium; and deletes the encryption key. A second information apparatus: obtains the contents management information from the external recording medium and searches the network; obtains the encrypted contents data from the first information apparatus that holds the contents data concerned; and decrypts the encrypted contents data by using the encryption key contained in the contents management information.

14 Claims, 12 Drawing Sheets

U.S. PATENT DOCUMENTS

| | | | |
|---|---|---|---|
| 2005/0060756 A1* | 3/2005 | Daniels | 725/134 |
| 2005/0086696 A1* | 4/2005 | Daniels | 725/88 |
| 2005/0203927 A1* | 9/2005 | Sull et al. | 707/100 |
| 2005/0216942 A1* | 9/2005 | Barton | 725/97 |
| 2005/0262534 A1* | 11/2005 | Bontempi et al. | 725/58 |
| 2005/0268344 A1* | 12/2005 | Matsukawa et al. | 726/27 |
| 2006/0109854 A1* | 5/2006 | Cancel | 370/401 |
| 2006/0127037 A1* | 6/2006 | Van Hoff et al. | 386/83 |
| 2007/0258587 A1* | 11/2007 | Harada et al. | 380/201 |
| 2007/0274179 A1* | 11/2007 | Ito et al. | 369/47.12 |
| 2007/0283442 A1* | 12/2007 | Nakano et al. | 726/26 |

* cited by examiner

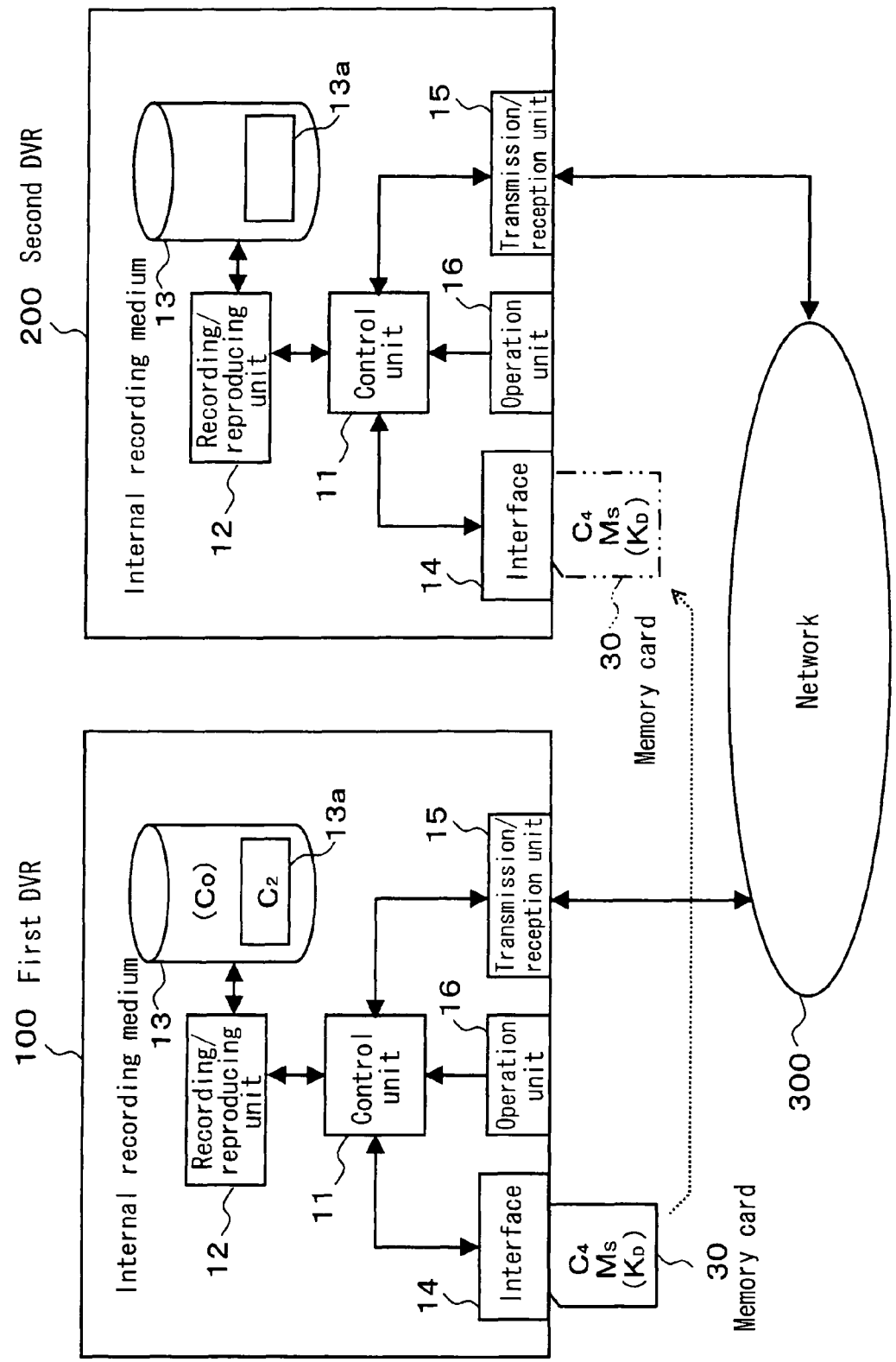
F I G. 1

F I G. 3
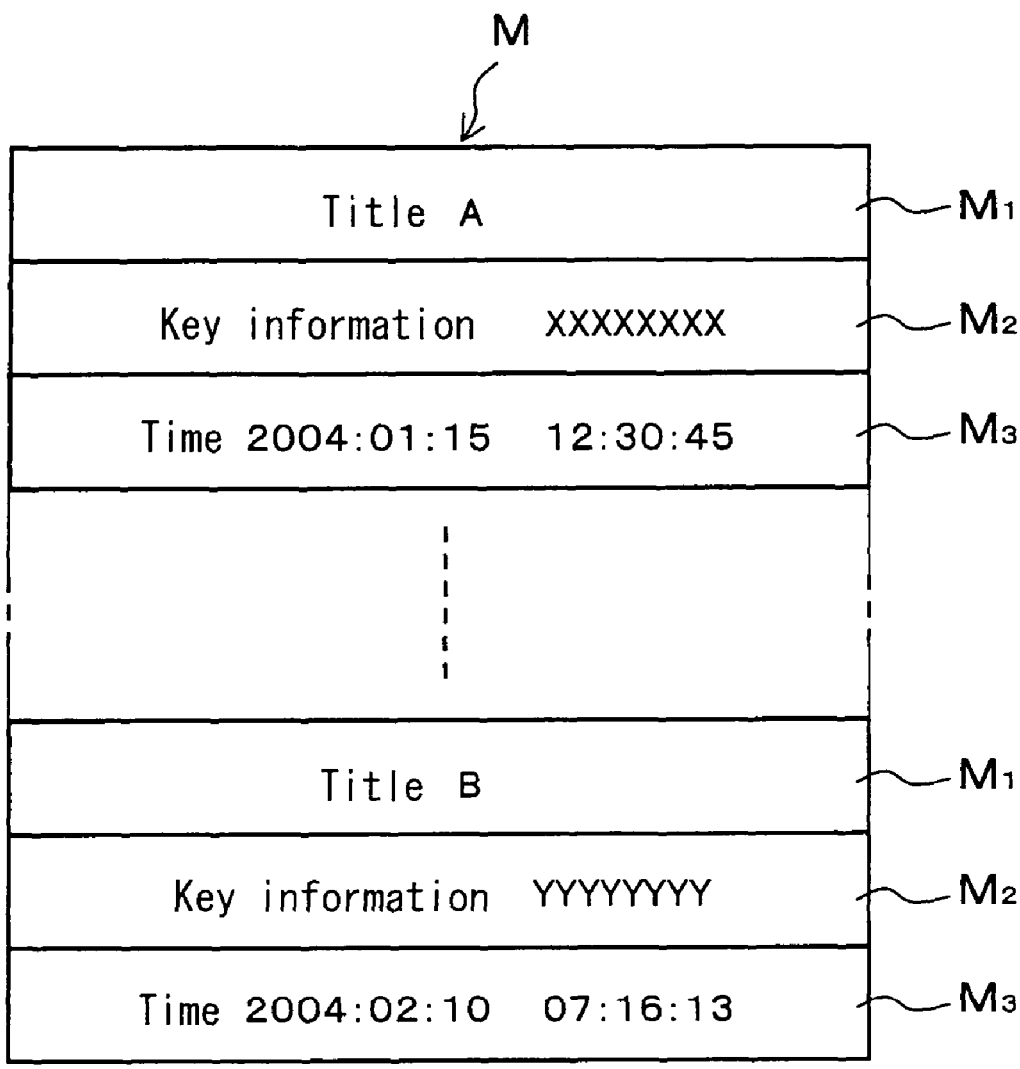

INFORMATION NETWORK SYSTEM AND INFORMATION APPARATUS

BACKGROUND OF THE INVENTION

1. Field of the Invention

The present invention relates to an information apparatus and its information network system for treating digital contents data such as picture and music.

2. Description of the Related Art

Recently, digitalization of picture and music has been promoted and many digital apparatuses have been introduced into homes. As for broadcasting systems, digitalization of ground wave broadcasting is making progress and broadcasting system will be shifted completely to digital television broadcasting with ground wave in 2011, for example, in Japan. Corresponding to the ground wave digital broadcasting, each of an electric machine company has started to sell various AV (Audio and Visual) digital apparatuses. These days, digital recording/playback apparatuses such as DVRs (Digital Video Recorders) have particularly attracted attention. A DVR can record an image to a digital recording medium (HDD, DVD-RAM, DVD-R, memory card, etc.) by digital-processing, thereby it is possible to save contents data of clear picture without degradation of picture quality over a long period.

Further, the DVR enables the contents data to be moved between the recording media. Since there is no degradation of picture data even if the contents data is moved or duplicated, distributors of original contents such as picture and music claim copyright protection for the contents data. In the meantime, the manufacturers have also been developing DVR equipments to correspond to the copyright protection.

When the contents data is recorded to the DVR, it is recorded in a format called MPEG (Moving Picture Experts Group) 2, which is one of video data compression methods. As one of the DVR functions, there is a function to move contents data to a memory card. The contents data that is moved to the memory card can be watched and heard by a portable terminal and the like. The contents data recorded in high picture quality has a large amount of information, so that it is impossible to move the contents data if the capacity of the memory card is small. In such a case, data is converted into MPEG4 format. By reducing the volume through converting the format of the contents data to MPEG4 format that has a much higher compression rate, it becomes possible to move the data to the memory card. However, the picture quality of the MPEG4 format is degraded in comparison to the contents data (original) of MPEG2 format. In case of data-movement different from data duplication, there is no contents data (as a target of data-movement) remained in the medium with the original data after the data movement since the original contents data is deleted along with the data movement. As a result, when a certain contents data is moved from the DVR to the memory card, and is again moved from the memory card to the DVR, the contents data in the DVR becomes deteriorated.

Therefore, it has been given some idea that the picture quality at original-level can be restored when the data is moved again to the DVR. FIG. 11 shows the schematic view of such DVR according to the prior art.

Original contents data $C_O$ is recorded to an internal recording medium 51. The contents data $C_O$ is moved to a memory card 30. For moving the data, volume is reduced by converting the data from MPEG2 format to MPEG4 format. At that time, the picture quality is deteriorated. The obtained contents data $C_4$ in MPEG4 format is moved to the memory card 30. At the time of data movement, an encryption key generating device 52 is started to generate an encryption key $K_D$, and the original contents data in MPEG2 format is encrypted by using the encryption key $K_D$. The encrypted contents data $C_2$ is saved in the internal recording medium 51 and at the same time the original contents data $C_O$ are deleted. Specifically, the original contents data $C_O$ is saved in a state where it cannot be accessed normally, which seems to be deleted on the appearance. With this, the encrypted contents data $C_2$, which is the original-level data without degradation of picture quality, is saved in the internal recording medium 51. The encryption key $K_D$ used is saved in the memory card 30, and when there occurs a request of data movement to DVR 400 from the memory card 30, the encryption key $K_D$ is obtained from the memory card 30 to decrypt the encrypted contents data $C_2$ saved using the encryption key $K_D$. In this case, the encryption key $K_D$ in the memory card 30 is deleted. As mentioned above, it is possible to restore the picture quality at original-level even if data movement is again carried out to the DVR.

As a prior art relating to the present invention, as disclosed in Japanese Published Patent Literature (Japanese Patent Unexamined Publication 2004-5526), for example, there is a contents-utilizing system to settle user demands and copyright protection in a well-balanced manner by encrypting the contents key information by use of contents ID and a network key shared within the network.

As shown in FIG. 12, in the related art described above, it is possible to restore the picture quality at original level through moving the encryption key $K_D$ from the memory card 30 to the first DVR 400 under the state where the encrypted contents data $C_2$ is saved in the first DVR 400. Thus, in the movement form where the data is moved from the memory card 30 to the first DVR 400 in which the encrypted contents data $C_2$ is saved, it is possible to restore the picture quality at original level. However, in a movement form where the data is moved to a second DVR 500 in which the encrypted contents data $C_2$ is not saved, the contents data $C_4$ of MPEG4 format is simply moved. Therefore, it is not possible to restore the picture quality at original level.

SUMMARY OF THE INVENTION

Therefore the main object of the present invention is to improve the picture quality when contents data is moved to another apparatus through a memory card.

In order to overcome the foregoing problems, an information network system of the present invention comprises a first information apparatus and a second information apparatus. The first information apparatus and the second information apparatus comprise, respectively: an internal recording medium for storing contents data; an interface which transfer the data relative to the contents data recorded in the internal recording medium to an external recording medium which is connected in a state of being freely attached or removed to each of the information apparatus; and a transmission/reception unit for connecting the information apparatus to a network. The internal recording medium comprises an area for storing the contents data and a concealment area for storing various kinds of data under access limitation. The first information apparatus: upon receiving a request to move the contents data to the external recording medium in a state that the external recording medium is connected to the first information apparatus, reads out the contents data as target for movement from the internal recording medium in order to transfer and record it to the external recording medium after performing compression-conversion; encrypts the contents data as target for movement by using an encryption key to be stored in the concealment area of the internal recording medium; transfers and records contents management information that contains key information relative to the encryption key, to the external recording medium; and then deletes the key information relative to the encryption key. The second information apparatus: when the external recording medium that holds the compression-converted contents data is connected to the second information apparatus, obtains the contents management information from the external recording medium and searches the network by using the obtained contents management information to find out the first information apparatus that holds the encrypted contents data corresponding to the contents management information; obtains the encrypted contents data from the first information apparatus found out through the network; and decrypts the obtained encrypted contents data by using the encryption key contained in the contents management information.

As for an information apparatus applicable to the information network system of the above-described construction, the present invention provides the structure as follows. That is, the information apparatus according to the present invention comprises an internal recording medium for storing contents data; a recording/playback unit to do recording/reproducing the contents data to the internal recording medium; an interface which transfers and records the data relative to contents data recorded in the internal recording medium to an external recording medium which is connected in a state of being freely attached or removed; a transmission/reception unit for transmitting and receiving data between a network; and a control unit. The internal recording medium comprises an area for storing the contents data and a concealment area for storing various kinds of data under access limitation. The control unit comprises: a compressor which reads out the contents data from the internal recording medium by controlling the recording/reproducing unit to compress the contents data for conversion when a request is inputted to move the contents data to the external recording medium in a state that the external recording medium is being connected; a first transfer device to transfer and record the compression-converted contents data to the external recording medium through the interface; an encryption device for encrypting the contents data; a storing device for saving the encrypted contents data to the concealment area of the internal recording medium; a second transfer device to transfer and record the contents management information containing key information relative to encryption key that is used for encrypting the contents data, to the external recording medium through the interface; a deleting device for deleting the key information after the contents management information is transferred and recorded to the external recording medium; a searching device which obtains the contents management information from the external recording medium that holds the compression-converted contents data, and searches another information apparatus, that is connected to the network through the transmission/reception unit, by using the obtained contents management information; an acquisition device which, when another information apparatus that holds the encrypted contents data corresponding to the contents management information is found through the search of the network, obtains the encrypted contents data from the information apparatus found through the network; and a decryption device for decrypting the encrypted contents data obtained by the acquisition device by using the encryption key contained in the contents management information.

In the information network system of this structure, when the first information apparatus transfers and records the compression-converted contents data to the external recording medium, the contents management information containing the key information relative to the encryption key, which corresponds to the encrypted contents data, is also recorded to the external recording medium. After the contents data is encrypted by using the encryption key, the encrypted contents data is stored in the concealment area of the internal recording medium. Then, the contents data and the key information relative to the encryption key are deleted. Thus, the encrypted contents data remains in the first information apparatus under saving in a concealed state, so that it is impossible in the first information apparatus to decrypt and reproduce the contents data after movement. The concealment area is not accessible from outside with a normal operation mode. Thus, the security can be improved by storing the encrypted contents data to the concealment area.

The external recording medium, to which the compression-converted contents data is recorded, may be removed from the first information apparatus to reproduce the data by a portable terminal and the like (second information apparatus is also available). In that case, picture deterioration occurs since it is reproduction of compression-converted contents data. For achieving picture quality at original level when the external recording medium holding the compression-converted contents data is the second information apparatus, the contents management information is obtained form the external recording medium, and the network is searched using the contents management information for finding the first information apparatus that holds the encrypted contents data corresponding to the contents management information. When finding the first information apparatus, the encrypted contents data is obtained from the first information apparatus found through the network. Then, the second information apparatus decrypt the obtained encrypted contents data using the encryption key contained in the contents management information that is obtained from the external recording medium. The encrypted contents data as the decrypting target at this time has the picture quality at original level. Thus, it is possible in the second information apparatus to regenerate the picture quality at original level.

In the structure described above, there are some preferable embodiments as shown below. As one of the preferable forms, the first information apparatus, upon receiving a request to move the contents data to the external recording medium, performs mutual authentication between the external recording medium, and performs the above-described operations only when the authentication succeeds. Thus, by performing a series of processing after confirming that the external recording medium is not in an illegal state, movement of the compression-converted contents data and the contents management information data containing the key information can be achieved only to a regular external recording medium. Hereby, the security can be improved.

As another preferable embodiment, the second information apparatus: finds the first information apparatus that holds the encrypted contents data in the network; performs mutual authentication between the first information apparatus being found; and performs above-described operations only when the authentication succeeds. Thus, by performing a series of processing after confirmation that the second information apparatus is not in an illegal state, movement of the encrypted contents data can be done only to a regular second information apparatus. Hereby, the security can be further improved.

As still another preferable embodiment, on encrypting the contents data in the first information apparatus, the key information relative to the encryption key is generated in advance, and the contents data is encrypted by the generated encryption key of the key information.

Further, as yet another preferable form, the contents management information contains title information relative to the encrypted contents data and time information to indicate the time of encryption in addition to the key information relative to the encryption key.

Furthermore, as another preferable embodiment, the first information apparatus carries out time-management to the encrypted contents data that is stored in the concealment area, and performs automatic deletion by giving preference to the encrypted contents data with low access frequency. As a result, it is possible to constantly keep the capacity remained in the internal recording medium to some extent by automatically deleting the encrypted contents data which becomes less necessary with time.

Moreover, as still another preferable embodiment, the external recording medium comprises a protect area that is accessible only when authentication between the first information apparatus and the second information apparatus is succeeded, and the first information apparatus transfers and records the contents management information to the protect area. Hereby, security can be further improved by transferring and recording the contents management information containing the key information to the protect area.

Further, as yet another preferable embodiment, the first information apparatus does not delete the contents management information but stores and manages it in the concealment area.

Furthermore, as another preferable embodiment, the first information apparatus carries out time-management to the contents management information stored in the concealment area, and performs automatic deletion by giving precedence to the encrypted contents data with low access frequency. As a result, it is possible to constantly keep the capacity remained in the internal recording medium to some extent by automatically deleting the contents management information which becomes less necessary with time.

Moreover, an information network system of the present invention comprises a first information apparatus and a second information apparatus. The first information apparatus and the second information apparatus comprise, respectively: an internal recording medium for storing contents data; an interface which transfers to record data relative to the contents data recorded in the internal recording medium to an external recording medium which is connected in a state of being freely attached or removed to respective the information apparatus; and a transmission/reception unit for connecting the information apparatus to a network. The internal recording medium comprises an area for storing the contents data and a concealment area for storing various kinds of data with limited accessibility. The first information apparatus: upon receiving a request to move the contents data from the second information apparatus through the network, encrypts the contents data as target for movement-request; generates contents management information containing key information relative to encryption key used for encryption; transfers encrypted the contents data along with the contents management information to the second information apparatus through the network; deletes the key information relative to the encryption key from the contents management information after transfer; and stores the management contents information from which the key information is deleted and the encrypted contents data to the concealment area. The second information apparatus: after requesting movement of the contents data to the first information apparatus through the network and receiving the encrypted contents data and the contents management information from the first information apparatus, obtains the encryption key within the key information contained in the received contents management information, and decrypts the encrypted contents data by using the encryption key.

According to the above-described structure, it is not necessary to transfer the encrypted contents data through the network. Thus, the present invention can be performed only by transferring the contents management information, thereby it is enabled to do high-speed processing.

According to the present invention, it is possible to regenerate the picture quality at original level in the date-moved information apparatus, even when data-movement is carried out from the external recording medium holding the compression-converted contents data to the information apparatus that does not have the encrypted contents data at original level.

The information network system and the information apparatus of the present invention are extremely useful for realizing the data-movement between DVRs using a memory card. Further, they can be easily applied to environments to treat contents data requiring copyright protection such as picture, music and the like on the network.

BRIEF DESCRIPTION OF THE DRAWINGS

Other objects of the present invention will become clear from the following description of the preferred embodiments and the appended claims. Those skilled in the art will appreciate that there are many other advantages of the present invention possible by carrying out the present invention.

FIG. 1 is a block diagram for showing the structures of an information apparatus and an information network system according to a first embodiment of the present invention;

FIG. 3 is an illustration of a format of contents management information according to the embodiment of the present invention;

DETAILED DESCRIPTION OF THE INVENTION

Figure 2:
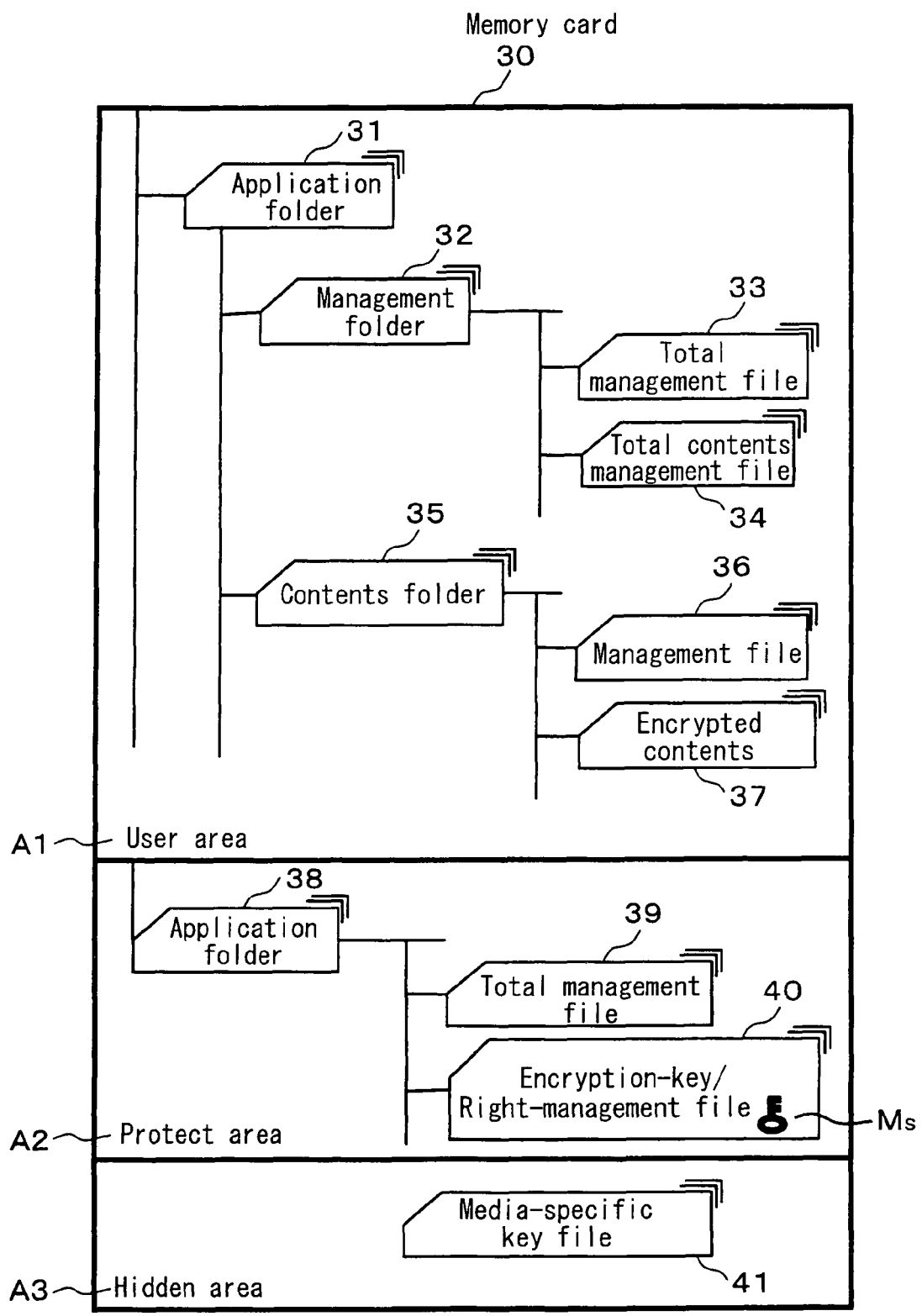
FIG. 2 is a block diagram to show the structure of a system file of a memory card according to the embodiment of the present invention.

In the followings, embodiments of the information apparatus and the information network system according to the present invention will be described in detail by referring to the accompanying drawings.

First Embodiment

FIG. 1 is a block diagram for showing the structure of the information network system to which the information apparatus (DVR) according to the first embodiment of the present invention is connected through a network. In FIG. 1, reference numeral 100 is a first DVR (first information apparatus), 200 is a second DVR (second information apparatus), and 300 is a network. The first DVR 100 and the second DVR 200 are connected through the network 300 such as LAN. The structure of the second DVR 200 is the same as that of the first DVR 100. The present invention does not depend upon forms of protocol used for achieving communication on the network 300 and the circuit shape of the network 300.

Further, in FIG. 1, reference numeral 11 is a control unit for managing control of the entire DVR, 12 is a contents data recording/reproducing unit, 13 is an internal recording medium such as a hard disc, 30 is a memory card (external recording medium), 14 is an interface for accessing the data between the memory card 30, 15 is a transmission/reception unit, and 16 is an operation unit.

The control unit 11 comprises a CPU (central processing unit), a ROM (read-only memory) to which a program is stored, and a RAM (random access memory) as a working area. The control unit 11 controls the recording/reproducing unit 12 to access to the internal recording medium 13 for writing and recording the original contents data $C_O$ to the internal recording medium 13, and for reading out and reproducing the contents data $C_O$ from the internal recording medium 13. In addition to an area for storing the contents data, there is also a concealment area 13a secured in the internal recording medium 13 for keeping the data to be confidential (e.g. the encrypted contents data $C_2$).

The control unit 11 accesses to the memory card 30 through the interface 14 so as to read out from the internal recording medium 13 in order to transfer and write the contents data, and to transfer and write the contents data that is read out from the memory card 30 to the internal recording medium 13. The control unit 11 controls the transmission/reception unit 15 to access to the network 300, and exchanges the contents data with other information apparatuses that are connected to the network 300. The control unit 11 is further provided with the following functional elements.

That is, the control unit 11 comprises:

a compressor which controls the recording/reproducing unit 12 to read out the contents data from the internal recording medium 13 and performs compression-conversion, when a request is inputted to move the contents data to the memory card 30 while the memory card 30 is being connected;

a first transfer device which transfers to record the compression-converted contents data $C_4$ to the memory card 30 through the interface 14;

an encryption device for encrypting the contents data;

a storing device which stores the encrypted contents data $C_2$ to the concealment area 13a of the internal recording medium 13;

a second transfer device which transfers to record the contents management information, that contains the key information $M_2$ relative to the encryption key $K_D$ that is used for encrypting the contents data, to the memory card 30 through the interface 14;

a deleting device for deleting the key information $M_2$ after transfer for recording the contents management information M to the memory card 30;

a searching device which obtains the contents management information M from the memory card 30 that holds the compression-converted contents data $C_4$ and, using the obtained contents management information M, searches another DVR that is connected to the network 300 through the transmission/reception unit 15;

an acquisition device which obtains the encrypted contents data $C_2$ from that DVR through the network 300, when another DVR, that holds the encrypted data $C_2$ corresponding to the contents management information M2, is found by the network search obtains; and a decryption device which decrypts the encrypted contents data obtained by the acquisition device by using the encryption key $M_2$ contained in the contents management information M.

FIG. 2 shows a file system of the memory card 30. The file system of the memory card 30 is divided roughly into three areas, i.e. user area A1 which can be normally accessed, protect area A2 which can be accessed after authentication processing is achieved between the apparatus and the memory card 30, and hidden area A3 which cannot be accessed at all from outside.

Encryption processing appropriate for the memory card is performed on the contents data converted to MPEG4 format using the same encryption key $K_D$ as the one before conversion. The compression-converted contents data $C_4$ generated by the processing is stored within a contents folder 35 in an application folder 31 within the user area A1. At that time, various kinds of information relative to the compression-converted contents data $C_4$ is copied to a management file 36 within the contents folder 35 and a total contents management file 34 within the management folder 32.

Media-specific key $K_S$ is stored in a media-specific key file 41 of the hidden area A3. The contents management information M containing the encryption key $K_D$ is encrypted by the media-specific key $K_S$ and the encrypted contents management information $M_S$ is stored in a vacant area of an encryption-key/right-management file 40 within the protect area A2.

FIG. 3 shows the format of the contents management information M. The contents management information M is consist of title information $M_1$, key information $M_2$ relative to the encryption key $K_D$ and time information $M_3$ indicating the saving time.

Figure 4:
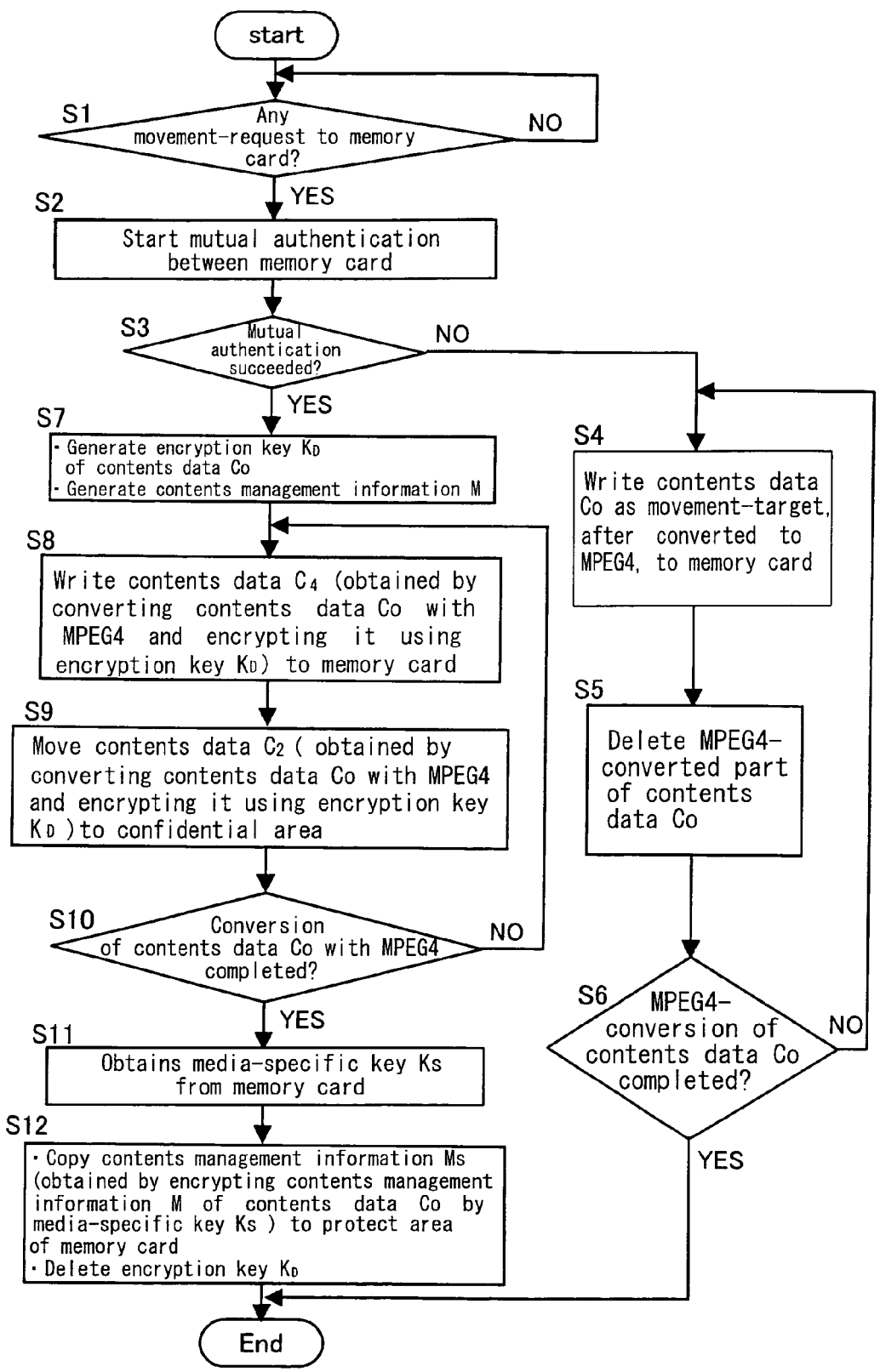
FIG. 4 is a flowchart for showing action of a first DVR in the information network system according to the first embodiment of the present invention.
Figure 5:
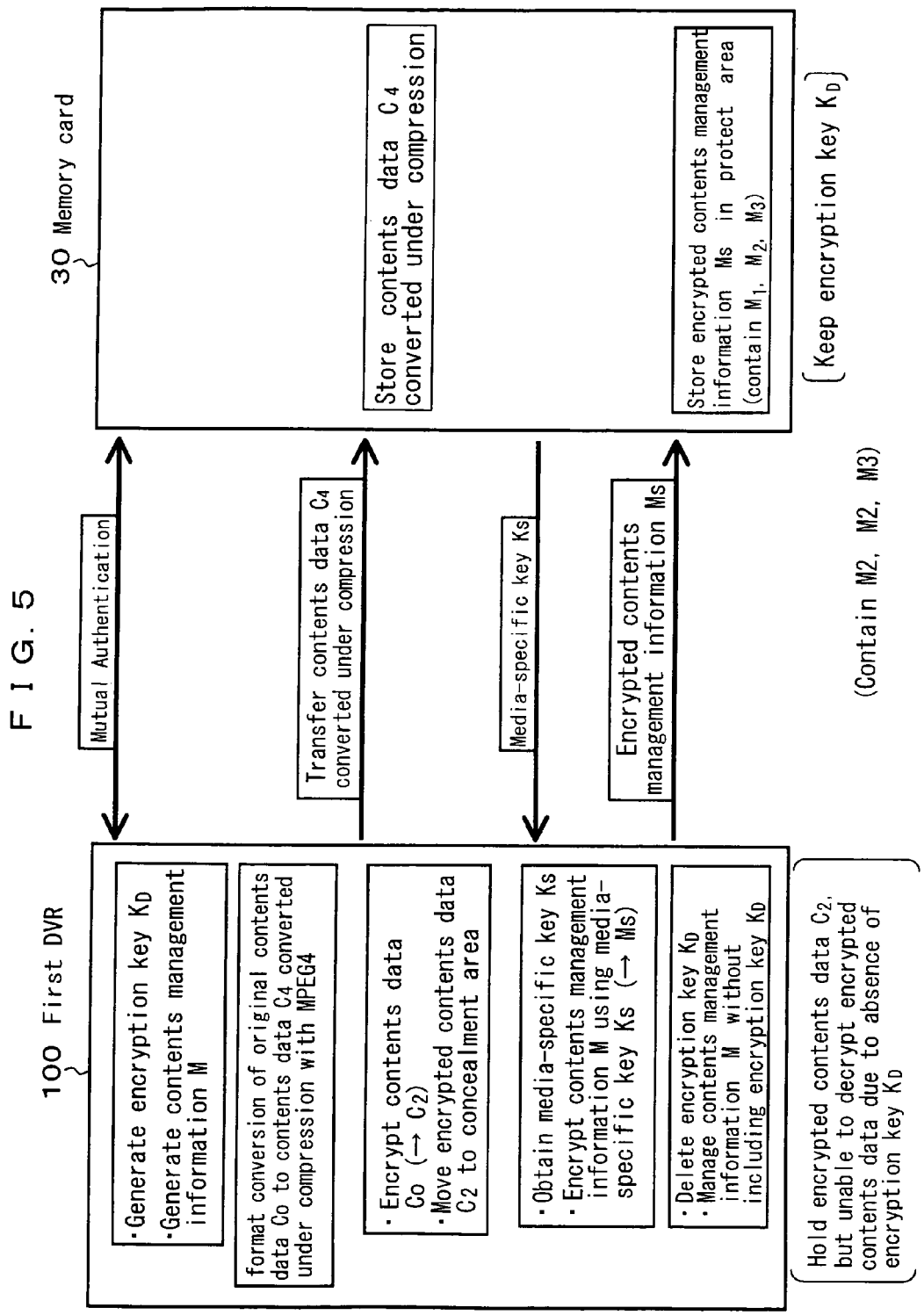
FIG. 5 is a sequence chart for showing action of the first DVR in the information network system according to the first embodiment of the present invention.

Next, explanation is given to action of the information apparatus according to the embodiment, which is structured as described above. First, action of the first DVR 100 will be described by referring to the flowchart of FIG. 4 and the sequence chart of FIG. 5. In the description provided below, "(100)" is added to the end of reference numeral of each element constituting the first DVR 100, while "(200)" is added to the end of reference numeral of each element constituting the second DVR 200. With this, the two can be distinguished.

It is assumed in the first DVR 100 that the memory card 30 is set in the interface 14 (100). A user performs data-movement operation to the memory card 30 by designating the contents in the operation unit 16 (100) of the first DVR 100. Thereby, a data-movement request is given to the control unit 11 (100).

When the data-movement request to the memory card 30 is detected in the control unit 11 (100) in step S1, it proceeds to step S2 where mutual authentication is performed between the control unit 11 (100) and the memory card 30.

Then, it is judged in step S3 whether or not the mutual authentication is succeeded. When failed, it proceeds to step S4, and proceeds to step S7 when succeeded. When the mutual authentication fails and it proceeds to step S4, the contents data $C_O$ corresponding to the data-movement target is read out from the internal recording medium 13 (100), and the read-out contents data $C_O$ is converted into the data of MPEG4 format based on control of the recording/reproducing unit 12 (100) by the control unit 11 (100). The obtained contents data $C_4$ of MPEG4 format is transferred to the memory card 30 through the interface 14 (100) and written to the memory card 30. The contents data $C_4$ of the MPEG4 format is not subject to encryption processing by the encryption key $K_D$.

Then, in step S5, the part in the contents data $C_O$ as the data-movement target, which has been converted into MEPG4 format, is deleted from the internal recording medium 13 (100).

Subsequently, it is judged in step S6 whether or not the processing for converting the contents data $C_O$ as the data-movement target into MPEG4 format is completed. When judged as uncompleted, it returns to step S4 to continue the processing. When judged as completed, the processing is ended.

When the mutual authentication fails after performing the processing described above, the contents data $C_4$ that is converted to the data of MPEG4 format is recorded to the memory card 30, and it becomes a state that the original contents data $C_O$ has been deleted in the first DVR 100.

In the meantime, when it proceeds to step S7 after succeeding the mutual authentication in step S3 (see FIG. 5), the encryption key $K_D$ used for encrypting the contents data $C_O$ as the data-movement target is generated by the control of the control unit 11. Then, the contents management information M is generated that contains the title information $M_1$, key information $M_2$ relative to the encryption key $K_D$, and time information $M_3$.

Then, in step S8, the contents data $C_O$ (data of MPEG2 format) as the data-movement target is converted into the data of MPEG4 format. After the format conversion, the contents data $C_O$ as the data-movement target is encrypted by using the encryption key $K_D$. There is SD_VIDEO format as an example of the encryption format here. The compression-converted contents data $C_4$ is written into the memory card 30 through the interface 14 (100).

Subsequently, in step S9, the part of the contents data $C_O$ (original) as the data-movement target, which has been converted into MEPG4 format, is encrypted by using the encryption key $K_D$, and the encrypted contents data $C_2$ is concealed (moved) to the concealment area 13a (100). The part of the contents data $C_O$ (original) as the data-movement target, which has been converted into MEPG4 format, is deleted from the internal recording medium 13 (100) successively. The encrypted contents data $C_2$ saved (moved) to the concealment area 13a (100) is treated as if it is not present in the internal recording medium 13 (100), to which only the processing with access right is accessible. The accessible processing herein means deletion of data, search of data, and extraction of data after mutual authentication, that is limited only to them. When the concealment area 13a (100) is full, the data is deleted automatically in order from the older ones in terms of time.

Then, it is judged in step S10 whether or not conversion of the contents data $C_O$ as the data-movement target into MPEG4 format is completed. When it is judged that the format conversion is not completed, it returns to step S8 to continue the processing and, when judged as completed, it proceeds to step S11.

When judged that conversion of the whole data of the contents data $C_O$ as the data-movement target into MPEG4 format is completed and it proceeds to step S11, the control unit 11 (100) obtains the media-specific key $K_S$ that is stored in the media-specific key file 41 in the hidden area A3 of the memory card 30 through the interface 14 (100).

Then, in step S12, the contents management information M of the contents data $C_O$ as the data-movement target is encrypted by using the media-specific key $K_S$, and the encrypted contents information $M_S$ is copied in a vacant area of the encryption-key/right-management file 40 within the protect area A2 of the memory card 30. The encrypted contents management information $M_S$ contains the title information $M_1$, key information $M_2$ relative to the encryption key $K_D$, and time information $M_3$ indicating the saving time. Immediately after completing the copy, the key information $M_2$ relative to the encryption key $K_D$ is deleted from the first DVR 100. The control unit 11 manages the contents management information M relative to the encrypted contents data $C_2$.

At this stage, there exist the compression-converted contents data $C_4$ encrypted according to the encryption format (SD_VIDEO format, etc) which corresponds to MPEG4 format, and the contents management information $M_S$ (containing the key information $K_2$ relative to the encryption key $K_D$) encrypted according to the media-specific key KS in the memory card 30. In addition, there exists the encrypted contents data $C_2$ under a non-accessible state in the internal recording medium 13 (100). In other words, it means that there is no key information $K_2$ relative to the encryption key $K_D$ in the first DVR 100. Thus, at this point, the encryption key $K_D$ only exists in the protect area A2 of the memory card 30. Therefore, there is in the state where the encrypted contents data $C_2$ in the internal recording medium 13 (100) cannot be decrypted without the memory card 30 that contains the encryption key $K_D$.

Figure 6:
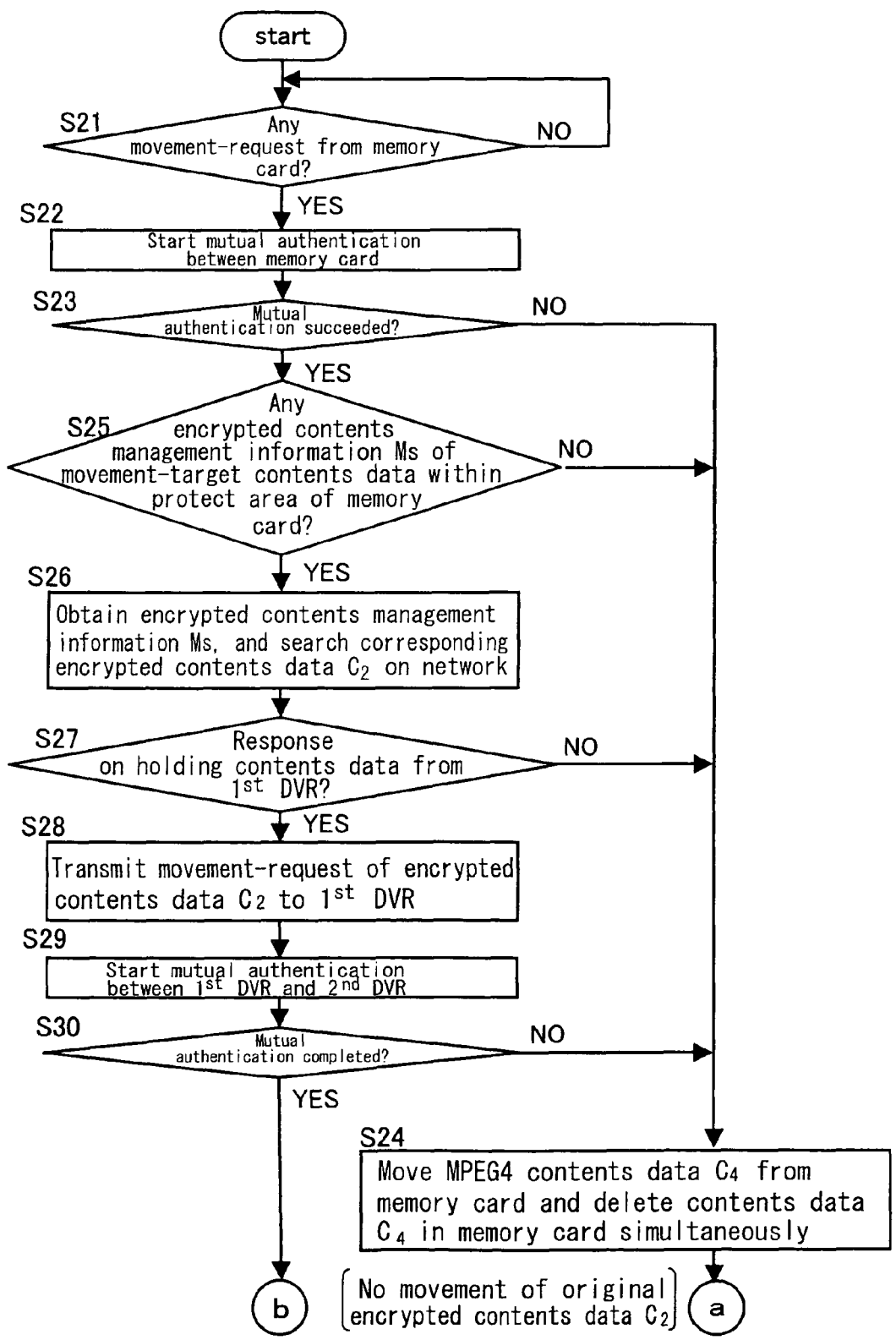
FIG. 6 is a flowchart (I) for showing action of a second DVR in the information network system according to the first embodiment of the present invention.
Figure 7:
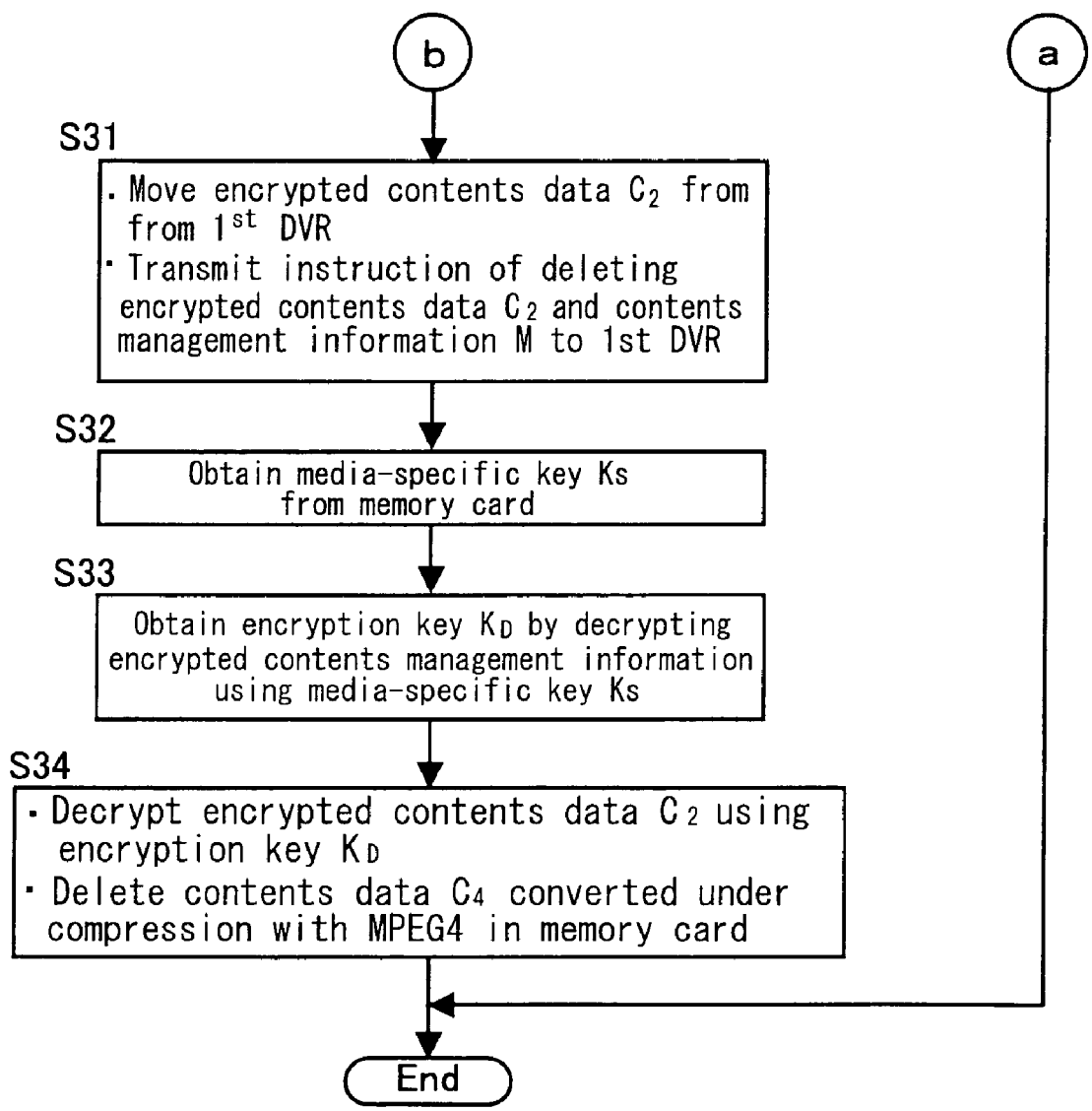
FIG. 7 is a flowchart (II) for showing action of the second. DVR in the information network system according to the first embodiment of the present invention.
Figure 8:
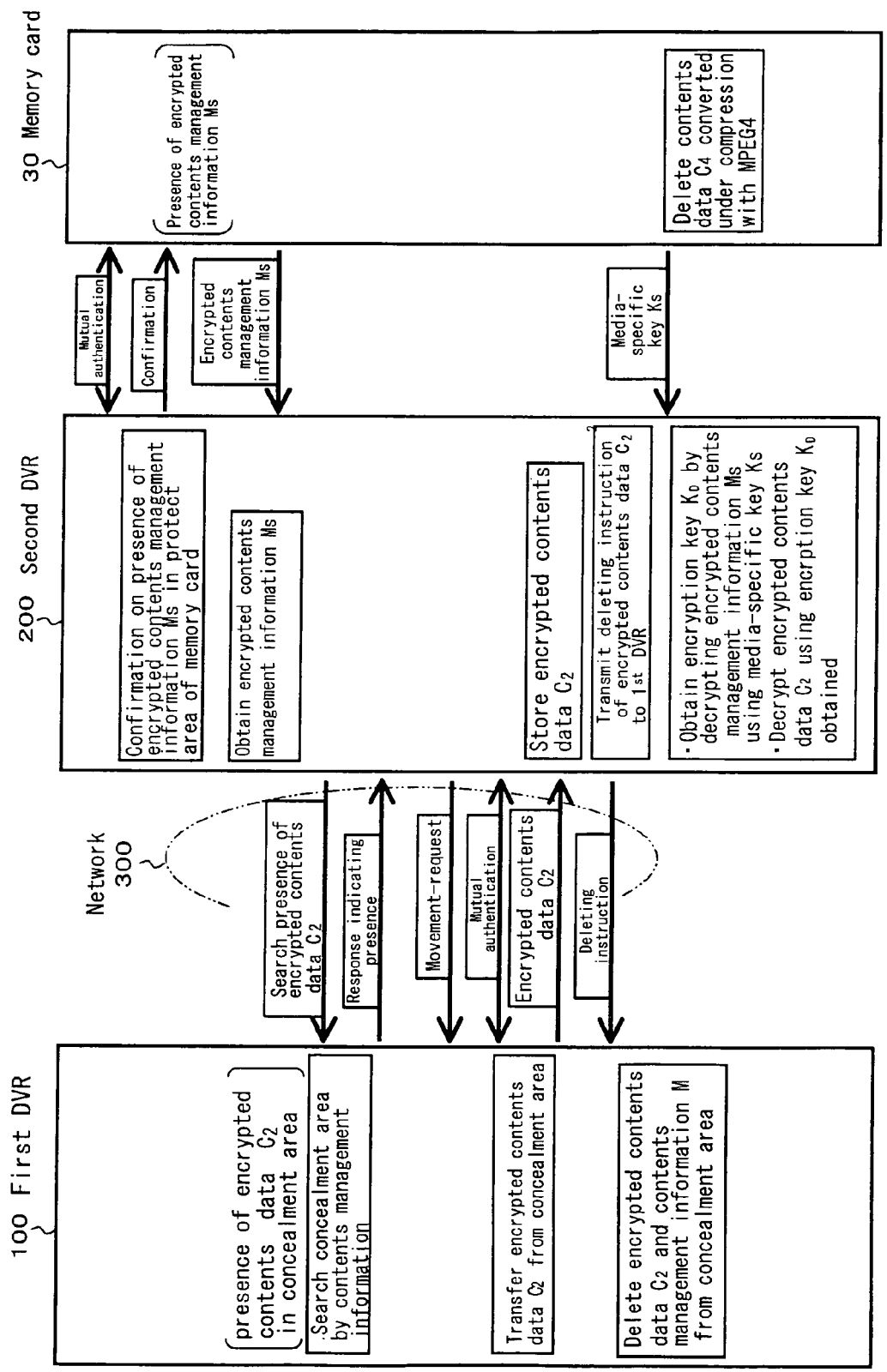
FIG. 8 is a sequence chart for showing action of the second DVR in the information network system according to the first embodiment of the present invention.

Next, action of the second DVR 200 will be described by referring to the flowchart of FIG. 6 and FIG. 7 in addition to the sequence chart of FIG. 8. It is assumed that the memory card 30 is removed from the first DVR 100 and set to the second DVR 200. The memory card 30 may or may not contain the compression-converted contents data $C_4$ and the encrypted contents management information $M_S$.

The user performs data-movement operation of the memory card 30 by designating the contents. Hereby, a data-movement request is issued to the control unit 11 (200) from the memory card 30.

When the data-movement request to the memory card 30 is detected in the control unit 11 (200) in step S21, it proceeds to step S22 to perform mutual authentication between the control unit 11 (200) and the memory card 30.

Then, it is judged in step S23 whether or not the mutual authentication is succeeded. When judged that the authentication is failed, it proceeds to step S24 and when judged as succeeded, proceeds to step S25. When judged that the mutual authentication is failed and it proceeds to step S24, the contents data $C_4$ converted into MPEG4 format is moved to the second DVR 200 from the memory card 30, and the contents data $C_4$ of the MPEG4 format within the memory card 30 is deleted. In other words, when the mutual authentication is ended abnormally, the encrypted contents data $C_2$ on the first DVR 100 is not moved to the second DVR 200 because the second DVR is judged as an illegal apparatus. The second DVR 200 can reproduce the contents data $C_4$ that is the data of MPEG4 format stored in the memory card 30. However, the picture quality thereof is deteriorated.

In the meantime, when it proceeds to step S25 after succeeding the mutual authentication (see FIG. 8), it is judged whether or not there exists the contents management information $M_S$ (title information $M_1$, key information $M_2$, and time information $M_3$) of the contents data as the data-movement target in the encryption-key/right-management file 40 inside the protect area A of the memory card 30. When judged that there is none, it proceeds to step S24 and, when judged that there is, proceeds to step S26.

In step S26, the control unit 11(200) obtains the contents management information Ms from the memory card 30. The control unit 11 searches the network 300 according to the obtained contents management information $M_S$ to see whether or not there exist encrypted contents data $C_2$ that matches the contents management information $M_S$ in any of the information apparatuses connected to the network 300. It is assumed here that the corresponding information apparatus is the first DVR 100. The control unit 11(200) transmits its own contents management information $M_S$ to the first DVR 100. The control unit 11(100) of the first DVR 100 collates the received contents management information $M_S$ of the second DVR 200 with the information stored in the concealment area 13a(100). When judged that information matches each other as a result of the collation, the control unit 11(100) transmits an instruction to hold the contents therein to the second DVR 200.

Then, in step S27, the control unit 11(200) judges whether or not there is a response from the first DVR 100 indicating that it holds the encrypted contents data $C_2$. When judged that there is no response, it proceeds to step S24 and, when judged that there is a response, proceeds to step S28.

In step S28, the control unit 11(200) transmits a data-movement request of the encrypted contents data $C_2$ to the first DVR 100.

Then, in step S29, the control unit 11 (100) and the control unit 11 (200) perform mutual authentication with each other (between the second DVR 200 and the first DVR 100). When judged that the authentication is failed, it proceeds to step S24 and, when judged as succeeded, proceeds to step S31.

When it proceeds to step S31 after succeeding the mutual authentication, the control unit 11(100) of the first DVR 100 moves the encrypted contents data $C_2$ stored in the concealment area 13a(100) to the second DVR 200. After completing movement of the encrypted contents data $C_2$, the control unit 11(200) of the second DVR 200 transmits an instruction for contents deletion to the first DVR 100. Upon receiving an instruction for contents deletion, the control: unit 11(100) of the first DVR 100 deletes the corresponding encrypted contents data $C_2$ that is stored in the concealment area 13a (100). In accordance with this, the control unit 11(100) also deletes the contents management information M stored in the concealment area 13a(100).

Then, in step S32, the control unit 11(200) of the second DVR 200 obtains the media-specific key $K_S$ from the memory card 30. In step S33, the control unit 11(200) obtains the encryption key $K_D$ by encrypting the contents management information $M_S$ obtained from the memory card 30 by using the media-specific key $K_S$. Then, in step S34, the control unit 11(200) decrypts the contents data $C_2$ that is encrypted by using the encryption key $K_D$, and at the same time deletes the compression-converted contents data $C_4$ within the memory card 30.

In the embodiment as described above, when the first DVR 100 moves the compression-converted contents data $C_4$ to the memory card 30, it is moved to the memory card 30 including the contents management information $M_S$ containing the key information $M_2$ relative to the encryption key $K_D$ for the compression-converted contents data $C_4$. Further, the key information $K_2$ of the compression-converted contents data $C_4$ is deleted after saving (storing) the encrypted contents data $C_2$, which is the original of the compression-converted contents data $C_4$, to the concealment area 13a (100). Thereby, it becomes impossible in the first DVR 100 to decrypt and reproduce the contents data that has been moved.

In the meantime, in the second DVR 200 to which the memory card 30 is set, after the first DVR 100 is found through a network search using the contents management information $M_S$ obtained from the memory card 30, the encrypted contents data $C_2$ is downloaded from the first DVR 100. Then, by decrypting the encrypted contents data $C_2$ by using the encryption key $K_D$ contained in the contents management information $M_S$ that is stored in the memory card 30, it is possible in the second DVR 200 to regenerate the picture quality at original level.

Even if the internal recording medium 13 is removed from the DVR and the encrypted contents data $C_2$ is illegally extracted from the concealment area 13a of the internal recording medium 13 by another apparatus, it cannot be decrypted and reproduced since there is no encryption key $K_D$ to decrypt it. Thus, the copyright of the contents data can be protected at the same time.

Second Embodiment

The contents data under the copyright protection is not allowed to be copied to other information apparatuses, and only data-movement is permitted. The contents data under the copyright protection exists in only one of the information apparatuses on the network. When there is no target contents data in the apparatus in use for viewing/listening to the contents data, it is essentially necessary to do data-movement. However, if the volume of the contents data is tremendous, it takes a long time to perform data-movement and increases the load on the network. The second embodiment of the present invention is designed to avoid such inconveniences and achieve high-speed processing. In the second embodiment, the data-movement processing is omitted in order to shorten the processing time.

FIG. 1 is cited for the structure of the information network system according to the second embodiment. Action of the information network system according to the second embodiment will be described by referring to sequence charts of FIG. 9 and FIG. 10.

Figure 9:
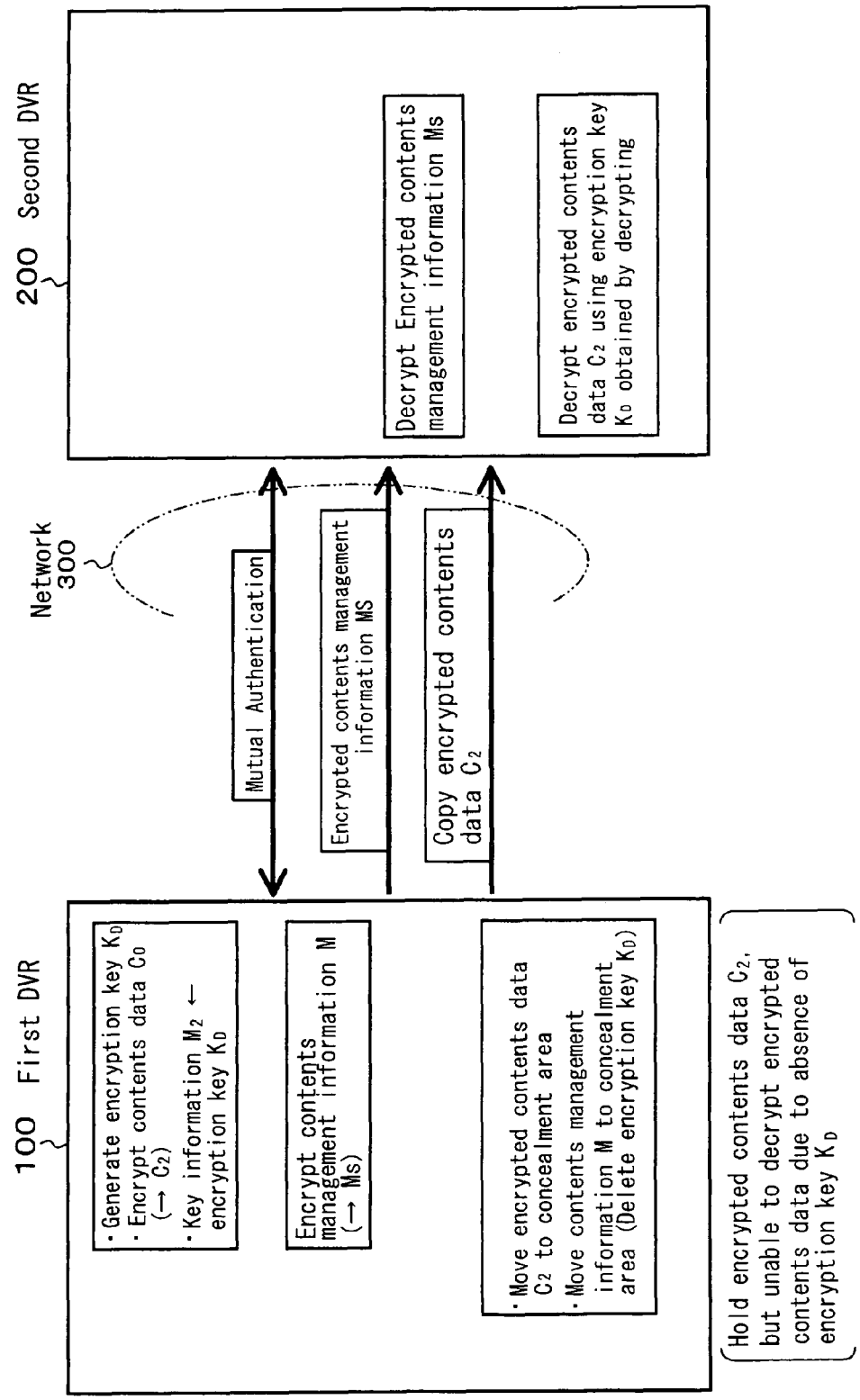
FIG. 9 is a sequence chart (I) for showing action of an information network system according to a second embodiment of the present invention.

First, by referring to FIG. 9, it is described about a case where the first DVR 100 issues a data-movement request to the second DVR 200. In the fist DVR 100, the encryption key $K_D$ for encrypting the original contents data $C_O$ is generated, and the contents data $C_O$ is encrypted by using the encryption key $K_D$. The encryption key $K_D$ is stored in the key information $M_2$ within the contents management information M. Then, the first DVR 100 performs mutual authentication between the second DVR 200. When the authentication is completed normally, the contents management information M is encrypted to be transmitted to the second DVR 200 (encrypted contents management information $M_S$).

The second DVR 200 obtains the contents management information M by decrypting the received encrypted contents management information $M_S$ according to the decrypting information that is obtained at the time of mutual authentication. Further, copy of the encrypted contents data $C_2$ is transmitted between the first DVR 100 and the second DVR 200 (first DVR 100→second DVR 200), and the first DVR 100 saves (stores) the transmitted encrypted contents data $C_2$ in the concealment area 13a(100). Furthermore, the first DVR 100 saves (stores) the contents management information M in the concealment area 13a(100) at the point where transmission of the encrypted data $C_2$ is completed. When the contents management information is saved, the encryption key $K_D$ as the content of the key information $M_2$ within the contents management information M is deleted. With this, it becomes impossible in the first DVR 100 to decrypt the encrypted contents data $C_2$ stored in itself. In the meantime, in the second DVR 200, the key information $M_2$ is extracted from the contents management information $M_S$, and the encrypted contents data $C_2$ is decrypted according to the extracted key information $M_2$.

Figure 10:
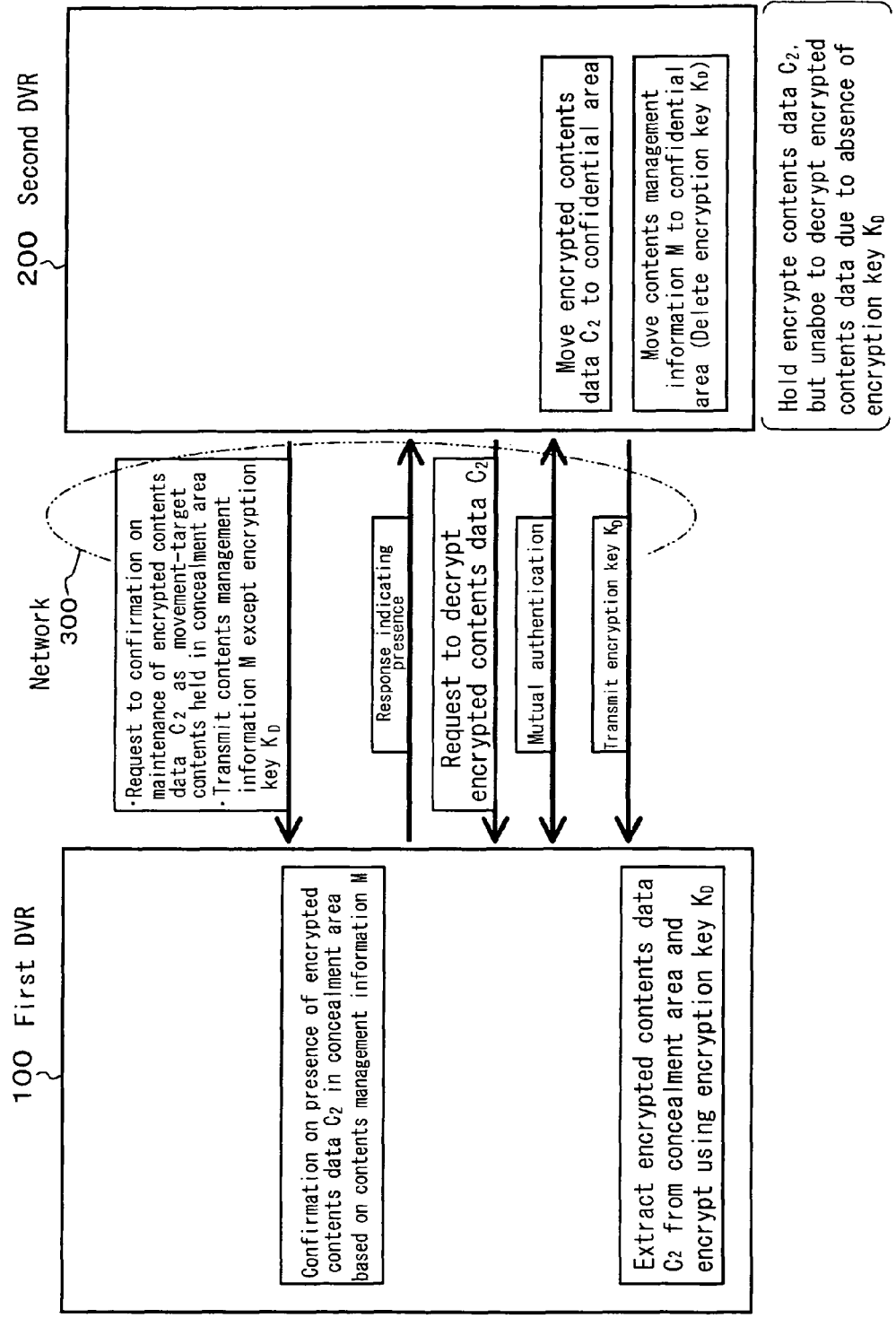
FIG. 10 is a sequence chart (II) for showing action of the information network system according to the second embodiment of the present invention.
Figure 11:
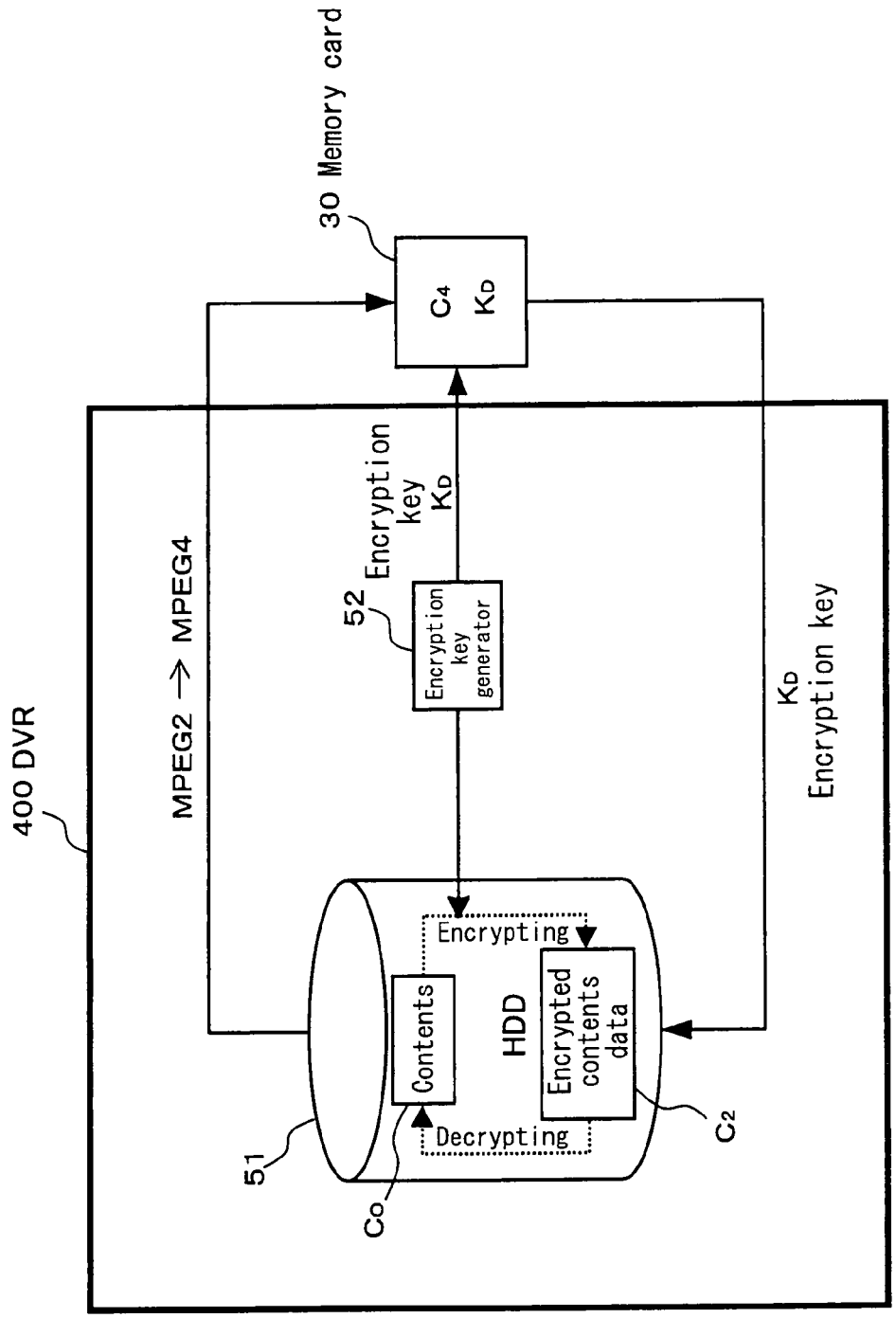
FIG. 11 is a schematic block diagram of a DVR according to a related art.
Figure 12:
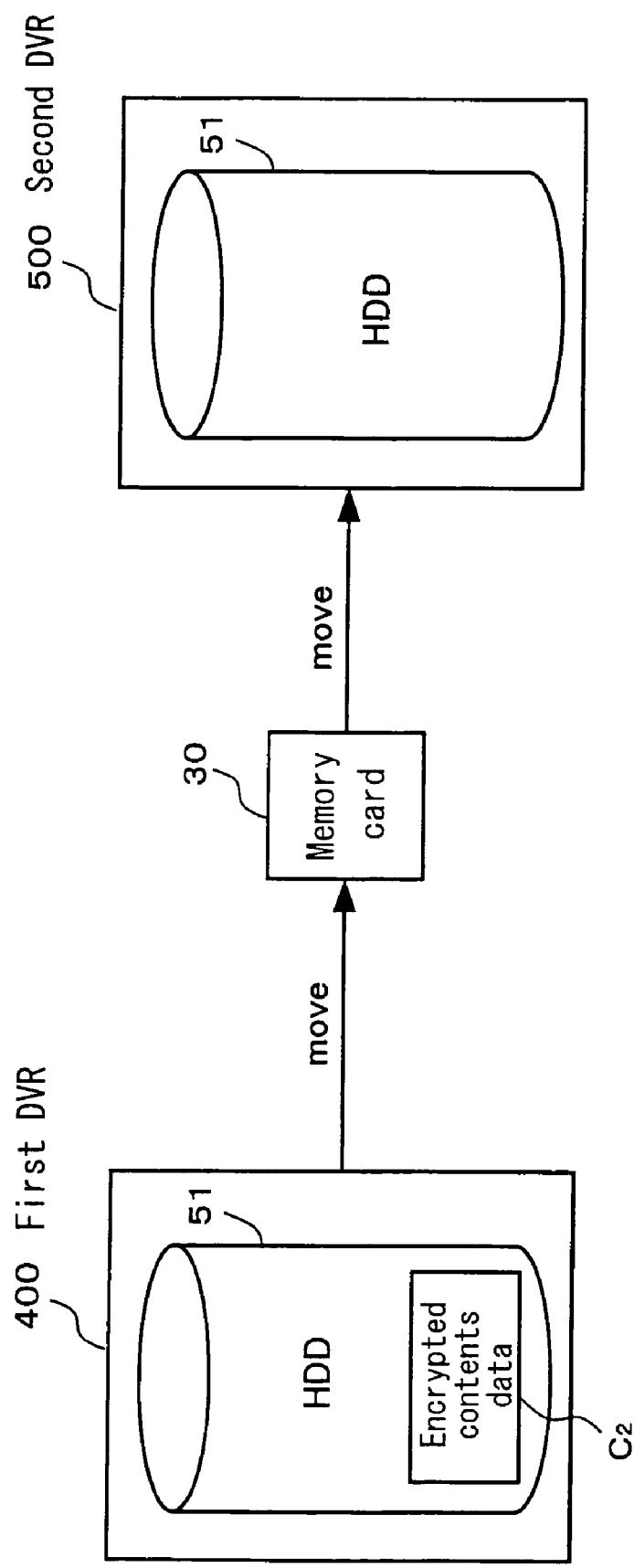
FIG. 12 is an illustration for describing the problems of the related art.

Next, by referring to FIG. 10, it is described about a case where the second DVR 200 issues a move-request of the contents data $C_O$ to the first DVR 100.

In this case, first, the second DVR 200 inquires to the first DVR 100 whether or not the corresponding encrypted contents data $C_2$ is held in the concealment area 13a(100). This inquiry is performed based on the contents management information M. Specific description will be provided below. The second DVR 200 transmits the contents management information M without key information $M_2$ to the first DVR 100. Here, the contents management information M from which the key information $M_2$ is eliminated serves as a contents-retention confirmation request. Upon receiving the contents-retention confirmation request from the second DVR 200, the first DVR 100 checks whether or not it keeps the corresponding encrypted contents data $C_2$ by collating the received contents management information M with the concealment area 13a(100). Upon confirming its existence, the first DVR 100 transmits a response indicating the presence (retention) to the second DVR 200. Upon confirming the presence, the second DVR 200 requests to the first DVR 100 to decrypt the encrypted contents data $C_2$. Upon receiving the decryption request, the first DVR 100 perform mutual authentication between the second DVR 200 for checking whether or not it is an illegal apparatus. When judged that it is not an illegal apparatus, the second DVR saves (stores) the corresponding encrypted contents data $C_2$ within itself to the concealment area 13a (200). In the meantime, the first DVR 100 extracts the encrypted contents data $C_2$ from the concealment area 13a(100), and decrypts the extracted encrypted contents data $C_2$ according to the key information M2 relative to the encryption key $K_D$ within the contents management information M that is obtained at the time of mutual authentication. At the point where the transmission of the contents management information to the first DVR 100 is completed, the second DVR 200 deletes the key information $M_2$ relative to the encryption key $K_D$ and then saves (stores) the contents management information M in the concealment area 13a(200).

In this way, the encrypted contents data $C_2$ is saved in the concealment area 13a of the apparatuses which have performed data-movement even once. Thus, when a move-request occurs, the key information is obtained from the communicating apparatus to perform the decrypting processing of the saved encrypted contents data $C_2$, thereby achieving high-speed processing. With this, a necessary time can be extremely shortened until the user views/listens to the desired contents data. Further, it allows a drastic reduction of traffic on the network 300.

In the above embodiments description has been given with respect to DVRs, however, the present invention can be applied to various information apparatuses which treat digital contents, and the same effects can be achieved as well.

The present invention has been described in detail by referring to the most preferred embodiments. However, various combinations and modifications of the components are possible without departing from the sprit and the broad scope of the appended claims.

What is claimed is:

1. An information network system, comprising a first information apparatus and a second information apparatus, wherein
the first information apparatus comprises:
a first internal recording medium for storing contents data;
a first interface which transfers data relating to the contents data recorded in the first internal recording medium to an external recording medium when the external recording medium is attached to the first information apparatus; and
a first transmission/reception unit for connecting the first information apparatus to a network, and
the second information apparatus comprises:
a second internal recording medium for storing contents data;
a second interface; and
a second transmission/reception unit for connecting the second information apparatus to a network, wherein:
the first internal recording medium comprises an area for storing the contents data and a secured area for storing various kinds of data with limited accessibility,
the first information apparatus is configured to: upon receiving a request to move the contents data to the external recording medium while the external recording medium is being attached to the first information apparatus,
read out the contents data from the first internal recording medium and transfer the read contents data to the external recording medium after performing compression-conversion to the read contents data;
encrypt the contents data by using an encryption key to be stored in the secured area of the first internal recording medium;
record contents management information that contains key information relating to the encryption key in the external recording medium; and
then delete the key information relating to the encryption key, and
the second information apparatus is configured to: when the external recording medium that holds the compression-converted contents data is attached to the second information apparatus,
obtain the contents management information from the external recording medium and search the network by using the obtained contents management information to find out the first information apparatus that holds the encrypted contents data corresponding to the contents management information;
obtain, through the network, the encrypted contents data from the found first information apparatus; and
decrypt the obtained encrypted contents data by using the encryption key contained in the contents management information.

2. The information network system according to claim 1, wherein
the first information apparatus is further configured to, upon receiving the request to move the contents data to the external recording medium, perform mutual authentication between the first information apparatus and the external recording medium, and perform the read, encrypt, record and delete operations only when the authentication succeeds.

3. The information network system according to claim 2, wherein, when the mutual authentication between the first information apparatus and the external recording medium fails, the first information apparatus is further configured to transfer to record the compression-conversion contents data the external recording medium without encrypting and storing the contents data to the secured area of the first internal recording medium.

4. The information network system according to claim 1, wherein
the second information apparatus is further configured to perform mutual authentication between the second information apparatus and the found first information apparatus; and perform the operations of said obtaining contents management information, obtaining the encrypted contents data and decrypting the obtained encrypted contents data only when the authentication succeeds.

5. The information network system according to claim 4, wherein, when the mutual authentication between the second information apparatus and the found first information apparatus fails, the second information apparatus is further configured to read out the compression-converted contents data stored in the external recording medium and stores the read compression-converted contents data to the second internal recording medium of the second information apparatus without obtaining the encrypted contents data from the found first information apparatus.

6. The information network system according to claim 1, wherein, for encrypting the contents data, the first information apparatus is configured to generate the encryption key in advance, and encrypt the contents data by using the generated encryption key.

7. The information network system according to claim 1, wherein
the contents management information contains, in addition to the key information relating to the encryption key, title information relating to the encrypted contents data, and time information when encryption is done.

8. The information network system according to claim 1, wherein
the first information apparatus is configured to perform time-management of the encrypted contents data that are stored in the secured area, and automatically and preferentially delete encrypted contents data to which access frequency is low.

9. The information network system according to claim 1, wherein
the external recording medium comprises a protect area that is accessible only when authentication between the first information apparatus and the second information apparatus is succeeded, and
the first information apparatus is configured to record the contents management information to the protect area.

10. The information network system according to claim 1, wherein
the first information apparatus is configured not to delete the contents management information but to store to manage the contents management information in the secured area.

11. The information network system according to claim 10, wherein
the first information apparatus is configured to perform time-management of the contents management information stored in the secured area, and performs automatically and preferentially delete contents management information to which access frequency is low.

12. An information network system, comprising a first information apparatus and a second information apparatus, wherein
the first information apparatus comprises:
a first internal recording medium for storing contents data;
a first interface which is configured to transfer data relating to the contents data recorded in the first internal recording medium to an external recording medium when the external recording medium is attached to the first information apparatus; and
a first transmission/reception unit for connecting the first information apparatus to a network, and
the second information apparatus comprises:
a second internal recording medium for storing contents data;
a second interface; and
a second transmission/reception unit for connecting the second information apparatus to a network, wherein:
the first internal recording medium comprises an area for storing the contents data and a secured area for storing various kinds of data with limited accessibility,
the first information apparatus is configured to: upon receiving, from the second information apparatus through the network, a request to move the contents data encrypt the contents data;
generate contents management information that contains key information relating to an encryption key used for encryption; transfers
transfer the encrypted contents data along with the contents management information to the second information apparatus through the network;
delete the key information relating to the encryption key from the contents management information after transfer; and
store the management contents information from which the key information is deleted and the encrypted contents data to the secured area, and
the second information apparatus is configured to: after requesting, to the first information apparatus through the network, movement of the contents data and receiving the encrypted contents data along with the contents management information from the first information apparatus,
obtain the encryption key from the key information contained in the received contents management information, and
then decrypt the received encrypted contents data by using the encryption key.

13. The information network system according to claim 12, wherein:
the second information apparatus is configured to, upon receiving, from the first information apparatus through the network, a request to move the contents data which has been decrypted and stored in the second information apparatus
transmit the contents management information except the key information relating to the encryption key to the first information apparatus through the network, and transmits transmit a request at the same time to confirm whether or not the encrypted contents data exists in the secured area of the first internal recording medium of the first information apparatus;

the first information apparatus is configured to, upon receiving the contents management information and the confirmation request from the second information apparatus through the network,
  check whether or not the encrypted contents data exists in the secured area of the first information apparatus by using the received contents management information and,
when the encrypted contents data exists, transmit a response indicating existence of the encrypted contents data to the second information apparatus through the network;
the second information apparatus is further configured to:
  upon receiving the response indicating existence of the encrypted contents data,
  transmit an instruction to decrypt the encrypted contents data to the first information apparatus through the network;
  encrypt the contents data which has been decrypted in the second information apparatus by using a second encryption key;
  move the encrypted contents data encrypted by the second information apparatus to the secured area of the second internal recording medium
  transmit second key information relating to the second encryption key that is used for encrypting the contents data to the first information apparatus through the network;
  after transmitting the second key information, delete the second key information relating to the second encryption key from the contents management information; and
  store the contents management information in the secured area of the second internal recording medium; and
the first information apparatus is further configured to, upon receiving the decrypting instruction and the second key information,
read out the encrypted contents data from the secured area of the first internal recording medium according to the decrypting instruction, and
  then decrypt the read encrypted contents data by using the second encryption key contained in the second key information.

14. An information apparatus, comprising:
an internal recording medium for storing contents data;
a recording and reproducing unit for recording the contents data to the internal recording medium and reproducing the content data;
an interface for transferring data relating to the contents data recorded in the internal recording medium to an external recording medium when the external recording medium is attached to the information apparatus
a transmission and reception unit for transmitting and receiving data between a network; and
a control unit, wherein:
the internal recording medium comprises an area for storing the contents data and a secured area for storing various kinds of data with limited accessibility, and
the control unit comprises:
  a compressor for reading out the contents data from the internal recording medium by controlling the recording and reproducing unit, and performing compression-conversion of the contents data, responsive to a request to move the contents data to the external recording medium;
  a first transfer device for transferring the compression-conversion contents data to the external recording medium trough the interface;
  an encryption device for encrypting the contents data;
  a storage device for storing the encrypted contents data to the secured area of the internal recording medium;
  a second transfer device for transferring contents management information containing key information relating to an encryption key that is used for encrypting the contents data to the external recording medium through the interface;
  a deleting device for deleting the key information after the contents management information is transferred to record to the external recording medium;
  a searching device for obtaining the contents management information from the external recording medium that holds the compression-conversion contents data, and searching another information apparatus that is connected to the network through the transmission and reception unit by using the obtained contents management information;
  an acquisition device for, when the another information apparatus which hold the encrypted contents data corresponding to the contents management information is found through the search of the network, obtaining the encrypted contents data from the another information apparatus through the network; and
  a decryption device for decrypting the encrypted contents data obtained by the acquisition device by using the encryption key contained in the contents management information.

* * * * *